DIGITAL COMMUNICATIONS RECEIVER

Filed Sept. 16, 1958 2 Sheets-Sheet 1

INVENTOR.
ARTHUR J. HANNUM,
BY
Noel B. Hammond
AGENT

INVENTOR.
ARTHUR J. HANNUM,

BY
Noel B. Hammond
AGENT

United States Patent Office 3,037,568

Patented June 5, 1962

3,037,568
DIGITAL COMMUNICATIONS RECEIVER

Arthur J. Hannum, Lawndale, Calif., assignor to Hughes Aircraft Company, Culver City, Calif., a corporation of Delaware Filed Sept. 16, 1958, Ser. No. 761,405
5 Claims. (Cl. 179—15)

Figure 1:
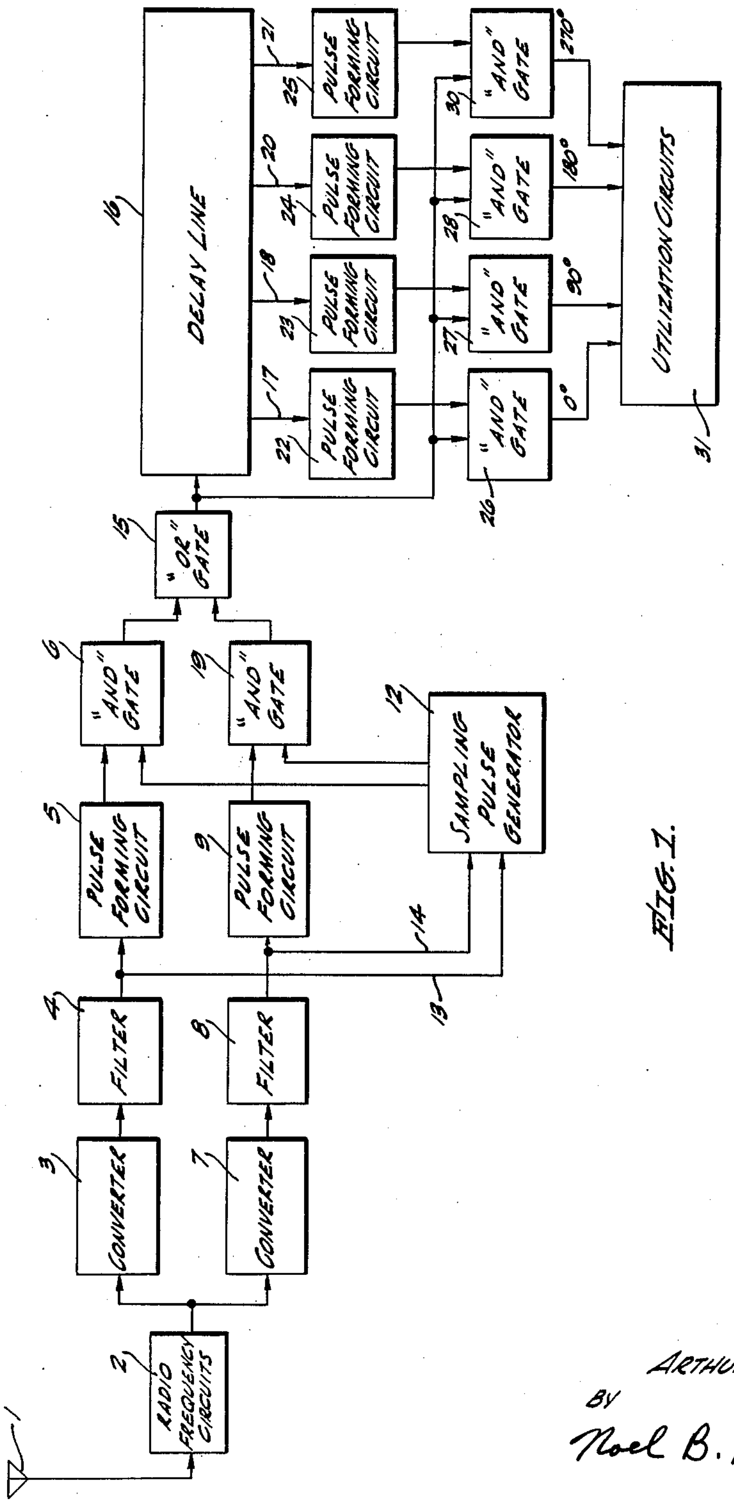

The present invention relates to a communications receiver for demodulating a wave modulated by discrete carrier phase shifts, and more particularly, to apparatus for demodulating a plurality of phase-modulated subcarrier waves in a single demodulator.

This invention is useful in a system of radio signaling wherein the phase of a carrier wave is modulated in accordance with digital data. More particularly, information is conveyed by the change or lack of change of phase between successive groups of cycles of a wave train. The modulation is accomplished by shifting the phase of the carrier to a predetermined one of several discrete phase states in accordance with the information to be transmitted. For example, the phase of a wave may be shifted between a first phase state, which may be called the zero degree or reference phase and the phase state which is 180 degrees out of phase with the reference phase. Thus, a 180 degree change of phase between successive modulation periods of the wave may be taken to represent a "mark" and no phase change between successive modulation periods may be taken to represent a "space."

More than two phase states may be used. For example, a four-phase state system may shift the phase of the carrier wave between 0°, 90°, 180°, or 270°. In this case, the information conveyed may be considered as a pair of binary digits rather than a mark or space. More particularly, a 0° phase change may be taken to represent the binary sequence 00; a 90° change, the sequence 01; a 180° change, the sequence 10; and a 270° change, the sequence 11. The digital information may, by proper coding be used to convey radioteletype information, picture information or voice information, for example.

When waves are propagated by means of reflection from the ionosphere, a single arriving sky wave is actually composed of a number of waves of small intensity and of random relative phases. This results in the modulation periods of the wave being lengthened in time duration so that successive modulation periods overlap or smear. It also results in phase irregularities throughout the duration of the modulation periods. Accordingly, prior art phase-modulation digital-communication systems have utilized modulation periods longer than the time delay due to multipath propagation. This limits the signaling rate of the system. Further, the phase distortion throughout the modulation period results in errors in interpreting the modulation of the received wave. Some systems may use a number of phase-modulated subcarrier waves having different frequencies to attain a high signaling speed in spite of time delays due to multipath propagation. However, these systems are complex because they provide an individual phase demodulator for each subcarrier wave.

Accordingly, it is an object of the invention to provide novel apparatus for accurately and reliably demodulating phase modulated waves at high signaling rates.

Another object of the present invention is the provision of a single, simple demodulator for demodulating a plurality of phase-modulated subcarrier waves.

Yet another object of the invention is to provide apparatus for demodulating a phase-modulated wave by means of a signal-derived phase reference.

In accordance with the invention there is provided pulse-forming means responsive to a plurality of phase-modulated subcarrier waves for developing phase-indicating pulses for each cycle of the waves. Individual phase-indicating pulses from each modulation period of each subcarrier wave are selected by gating means responsive to periodic sampling pulses. The selected pulses from each subcarrier wave are sequentially applied to a phase demodulator which includes delaying and pulse-forming means where a series of delayed time-staggered gating pulses are developed for each of the selected phase-indicating pulses. The series of gating pulses derived from each modulation period of each wave is compared with a selected pulse derived from a later modulation period of the same wave in coincidence-indicating means. Coincidence of a selected pulse with a particular gate pulse of a series indicates the relative phase of successive modulation periods.

Figure 2:
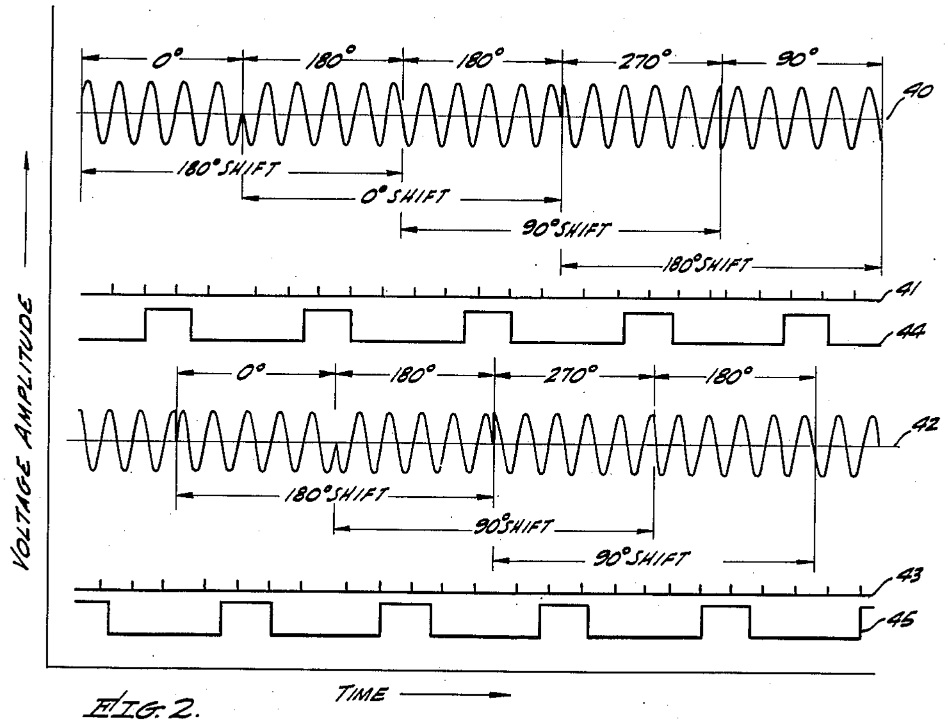
Figure 3:
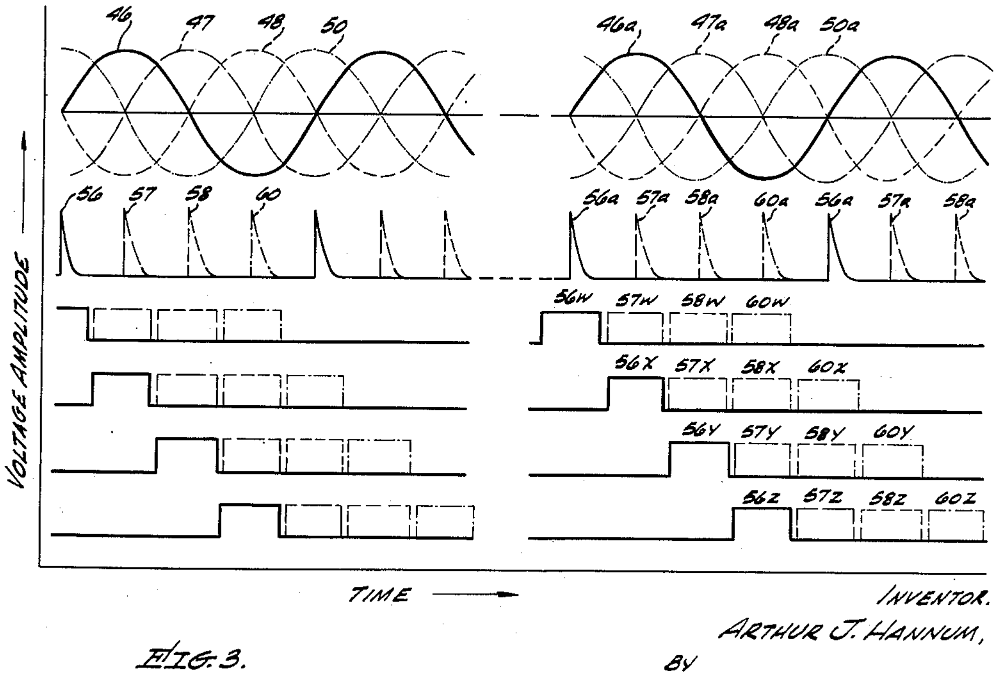

For a better understanding of the invention together with other and further objects thereof, reference is made to the following description taken in connection with the accompanying drawings in which an embodiment of the invention is illustrated by way of example only, and wherein:

FIG. 1 is a diagram in block form of an embodiment of the digital communications receiver of the present invention; and FIGS. 2 and 3 are diagrams of waveforms of signals appearing in the receiver of FIG. 1 in operation.

Referring now to FIG. 1 of the drawings, there is illustrated an antenna 1 for intercepting a carrier wave modulated by a plurality of phase-modulated subcarrier waves. The antenna 1 is connected to a radio-frequency circuits 2, which may include radio-frequency amplifiers and tuned circuits for rejecting noise and unwanted signals and for selecting and amplifying the desired signal. The radio-frequency circuits 2 may be, for example, the front end or input portion of a standard commercial communications receiver such as the model SP–600–JX manufactured by the Hammarlund Mfg. Co., Inc.

In order to separate each subcarrier wave from the carrier wave and at the same time convert the frequency of each subcarrier wave to a common intermediate frequency, an individual frequency converter is provided for each subcarrier wave. The frequency converters may be of the type shown and described in "Radio Engineers' Handbook" by F. E. Terman, first edition, at pp. 569 and 570, for example. The embodiment of the receiver of the present invention as illustrated is responsive to a wave having two subcarrier waves. However, it will be understood that any desired number of subcarrier waves may be accommodated by adding an additional converter and subsequent channel for each subcarrier wave.

Considering now the first subcarrier channel, a converter 3 is connected to the radio-frequency circuits 2 and converts the frequency of the first subcarrier wave to some convenient intermediate frequency, for example, 50 kilocycles. A bandpass filter 4 is connected to the converter 3 and is selected or adjusted to pass only the first subcarrier wave at the intermediate frequency. The filter may be an LC filter, a crystal filter, or a mechanical filter, for example.

The phase information conveyed by the subcarrier wave is changed to a form suitable for handling by digital techniques by means of a pulse-forming circuit 5 connected to the filter 4. A phase-indicating pulse is developed by the pulse-forming circuit 5 for each positive-going zero-axis crossing of the subcarrier wave. This may be done, for example, by amplifying and clipping the wave, differentiating the clipped wave and selecting only the differentiated pulses of one polarity. Although in the present embodiment of the invention the phase-indicating pulses are related to the positive-going zero-axis crossing of the subcarrier wave, by suitable modifications they could be related to the negative-going zero-axis crossings or any other characteristic part of a cycle of the wave. It will be apparent that the relative time of occurrence of phase-indicating pulses developed during any modulation period with respect to the time of occurrence of pulses developed during a successive modulation period will be related to the relative phases of the wave during the two modulation periods. More particularly, when the phase of the wave is shifted, the zero-axis crossings of the wave are displaced in time of occurrence. Hence, the phase-indicating pulses are also displaced in time of occurrence.

Clearly, only one phase-indicating pulse for each modulation period is required for the purpose of phase detection. Further, in order to provide a simple receiver, the phase modulation of each of the subcarrier waves is demodulated sequentially in one phase demodulator. Accordingly, one input terminal of a logical "and" gate 6 is connected to the pulse-forming circuit 5 for the purpose of passing at least one but not all of the phase-indicating pulses for each modulation period of the wave. The "and" gate 6 is a coincidence circuit which will pass phase-indicating pulses only when a sampling pulse is applied at a second input terminal. The "and" gate 6 may be of the diode type shown and described in "Digital Computer Components and Circuits" by R. K. Richards at pp. 37–39.

Similarly, the second subcarrier wave channel includes a converter 7 connected to the radio-frequency circuits 2. The converter 7 converts the frequency of the second subcarrier wave to the same intermediate frequency as that of the first subcarrier wave and may be identical to converter 3. A filter 8 is connected to the converter 7 and passes only the second subcarrier wave at the intermediate frequency. A pulse-forming circuit 9 is connected to the filter 8 and may be identical to the pulse-forming circuit 5 of the first channel. The pulse-forming circuit 9 develops at its output terminals a phase-indicating pulse for each positive zero-axis crossing of the second subcarrier wave at the intermediate frequency. A logical "and" gate 19 is connected to the output terminals of the pulse-forming circuit 9 and may be identical to "and" gate 6.

In order to provide sequential gating of the phase-indicating pulses derived from the first and second subcarrier waves, a sampling pulse generator 12 is connected to the second input terminals of the "and" gates 6 and 19. Two trains of sampling pulses are developed by the sampling pulse generator 12, the pulses of one train occurring in the intervals between the pulses of the other train. Each sampling pulse train is synchronized to the modulation period of one of the subcarrier waves, as indicated by the synchronizing links 13 and 14 connected between the sampling pulse generator 12 and the output terminals of the filters 4 and 8. Thus, one sampling pulse occurs during each modulation period of the subcarrier waves. The sampling pulse generator 12 may be, for example, a pair of multivibrators which are individually synchronized to the modulation periods of the waves.

The "and" gates 6 and 19 are responsive to the sampling pulses to pass at least one zero-axis-crossing pulse for each modulation period of the waves. An "or" gate 15 is connected to the output terminals of the "and" gates 6 and 19 for combining the sampled phase-indicating pulses into one pulse train. A pulse appears at the output terminal of the "or" gate 15 whenever a pulse is applied at either of the input terminals. The "or" gate may be of the diode type shown and described in "Digital Computer Components and Circuits" by R. K. Richards at pp. 37–39. It will be apparent that the pulse train at the output terminal of the "or" gate 15 will be composed of pulses from "and" gate 6 alternating with pulses from "and" gate 19. That is, the phase information derived from the two subcarrier waves appears sequentially or in serial form, at the output terminal of the "or" gate 15.

A single, simple phase demodulator is coupled to the "or" gate 15. In accordance with the invention, the demodulator comprises a delay line 16 connected to the "or" gate 15 having taps, the number of which depends upon the number of phase states used to transmit the intelligence. In the embodiment described, a four-phase state system is being considered by way of example. Thus, the delay line 16 is provided with 0° tap 17, a 90° tap 18, a 180° tap 20, and a 270° tap 21. The delay line 16 may be of the lumped-constant type, magnetostrictive type, or the like.

The first section of the delay line 16, from the input terminal to tap 17, is selected or adjusted to provide a time delay equal to that multiple of the intermediate frequency wave period which is nearest the modulation period of the input wave, less ⅛ of a wave period at the intermediate frequency. The second section of the delay line from tap 17 to tap 18 provides a delay of ¼ of a wave period and, similarly, the third and fourth sections of the delay line 16 each provide an additional ¼ wave period delay.

A pulse-forming circuit 22 is connected to the 0° tap 17 of the delay line 16 to extend or stretch the duration of a delayed pulse to be ¼ of a wave period in length at the intermediate frequency. Thus, at the output terminal of the pulse-forming circuit 22, there appears a gate pulse which occurs ⅛ of a wave period before the time when a later zero-axis crossing pulse may occur and extends for ⅛ of a wave period thereafter. Similarly, a pulse-forming circuit 23 is connected to tap 18, a pulse-forming circuit 24 is connected to tap 20 and a pulse-forming circuit 25 is connected to tap 21 of the delay line 16.

Each of the pulse-forming circuits 22, 23, 24, and 25 are identical and provide an output gate pulse whose duration corresponds to ¼ wave period at the intermediate frequency. Thus, a group of timestaggered probing or gating pulses appear at the output terminals of the pulse-forming circuits 22, 23, 24, and 25 for each modulation period of each wave. More particularly, a sampled phase-indicating pulse derived from one modulation period of one of the waves initiates a group of four gate pulses which occur during the next successive modulation period of the same wave. The four gate pulses occur sequentially in time and the time of occurrence of the group of four gate pulses will shift when the phase of the wave is shifted.

The sampled phase-indicating pulse derived from the next successive modulation period of the same wave will be coincident in time of occurrence with one and only one of the pulses from the group of four pulses derived from the previous modulation period of the wave. Coincidence of a phase-indicating pulse with a particular one of the four gate pulses indicates the relative phase difference between successive modulation periods of the wave.

In order to determine with which of the four gate pulses the phase-indicating pulse is coincident, four "and" gates 26, 27, 28, and 30 are provided. "And" gate 26, which may be termed the zero-degree-coincidence circuit is connected to pulse-forming circuit 22 to receive the earliest of the four gate pulses. Similarly, "and" gate 27, the 90° coincidence circuit, is connected to pulse-forming circuit 23 to receive the second gate pulse. In similar fashion, the remaining two "and" gates 28 and 30, the 180° and 270° circuits, are individually connected to the remaining two-pulse forming circuits 24 and 25 to receive the third and fourth gate pulses, respectively. Each of the "and" gates 26, 27, 28, and 30 may be identical to the sampling "and" gates 6 and 19.

The second input terminal of each of the "and" gates is connected to the output terminal of the "or" gate 15 to receive the undelayed phase-indicating pulse. Thus, the phase-indicating pulse is applied to each of the "and" gates 26, 27, 28, and 30 at the same time, while the gate pulses are applied sequentially in time. Coincidence will be indicated by the phase-indicating pulse being passed to the output terminal of one of the "and" gates 26, 27, 28, and 30. Thus, the relative phase difference of two successive pulses will be indicated by the appearance of the phase-indicating pulse at the output terminal of a particular one of the "and" gates 26, 27, 28, and 30.

It will be apparent that inasmuch as the pulses at the output terminal of the "or" gate 15 are alternately first and second subcarrier wave-phase-indicating pulses, the phase demodulator will alternately demodulate successive modulation periods of the two waves. Thus, it will be understood demodulated output signals will be in serial form.

Utilization circuits 31 are connected to the "and" gates 26, 27, 28, and 30. The utilization circuits 31 may include a high speed recorder, a teleprinter, picture reproducing apparatus, or voice decoding apparatus. The utilization circuits 31 may also include digital circuitry for converting the information from series to parallel or into any other form, as desired.

Referring now to the waveforms of FIG. 2 in conjunction with the block diagram of FIG. 1, the operation of the receiver will be described. Waveform 40 represents a phase-modulated subcarrier wave as it might appear at the output terminals of the converter 3. For the purpose of clarity of description, a low-frequency wave is illustrated, and distortions due to multipath propagation have not been shown. As drawn, each group of five consecutive cycles of waveform 40 represent a modulation period. Thus, five consecutive modulation periods are illustrated. The phase of the wave during the first modulation period may be taken as the reference phase or 0° phase state. Thus, during the second and third modulation periods the wave is in the 180° phase state. Similarly, during the fourth period, the wave is in the 270° phase state; and during the fifth period it is in the 90° phase state.

Because the digital information is conveyed by the difference in phase between successive modulation periods of the wave, the 180° shift in phase of the wave between the first and second periods may be interpreted as the binary numeral sequence 10. Similarly, the 0° phase shift between the second and third periods may be interpreted as 00. The third and fourth modulation periods give 01; and the fourth and fifth periods again represent 10.

For clarity, waveform 40 is illustrated as shifting abruptly from one phase state to another. However, because an infinite bandwidth would be required to produce such an abrupt shift, in actual practice, the shift in phase would appear to be more gradual. If desired, the wave may be amplitude modulated by a pulse having any desired shape such as that of a sine-squared wave to reduce the bandwidth required.

When the subcarrier wave illustrated by waveform 40 is applied to the pulse-forming circuit 5, a train of zero-axis-crossing pulses, illustrated by waveform 41, is developed. In accordance with the present embodiment of the invention, these pulses occur each time the wave crosses the zero axis in a positive direction. It will be apparent that a shift in phase of waveform 40 will cause a shift in time of occurrence of the pulses of waveform 41. Thus, the pulses of waveform 41 may be considered to be phase-indicating pulses. A second subcarrier wave is illustrated by waveform 42. The leading edges of the modulation periods of the second subcarrier wave 42 are staggered in time of occurrence with respect to the leading edges of waveform 40 so that only four complete modulation periods of waveform 42 are illustrated. The binary information conveyed by these four modulation periods is 10, 01, and again 01. Similarly, when waveform 42 is applied to pulse-forming circuit 9, a train of zero-axis-crossing pulses, illustrated by waveform 43, is developed.

Sampling pulse generator 12, which is synchronized to the two subcarrier waves develops two trains of sampling pulses illustrated as waveforms 44 and 45, respectively. The sampling pulses of each of these trains are staggered with respect to each other and an individual sampling pulse of each train occurs during each modulation period of each respective subcarrier wave. Every sampling pulse is of sufficient length to be coincident with at least one phase-indicating pulse. The phase-indicating pulses of waveform 41 are applied to the "and" gate 6 along with the sampling pulses of waveform 44. Those phase-indicating pulses of waveform 41 which are coincident with the sampling pulses of waveform 44 are passed to the output terminals of "and" gate 6.

Similarly, the phase-indicating pulses of waveform 43 and the sampling pulses of waveform 45 are applied to "and" gate 19. As before, the phase-indicating pulses of waveform 43 which are coincident with the sampling pulses of waveform 45 are passed to the output terminals of "and" gate 19. Because the sampling pulses of waveforms 44 and 45 are staggered in time of occurrence, the selected phase-indicating pulses of waveforms 41 and 43 will be applied alternately to the "or" gate 15.

Referring now to FIG. 3, there is illustrated simultaneously each of the events which may occur; however, it should be understood that these events do not occur simultaneously. The left-hand portion of FIG. 3 illustrates all of the conditions which may obtain during any modulation period of one of the subcarrier waves, and the right-hand portion of the figure illustrates the conditions which may obtain during the next successive modulation period of the same subcarrier wave. Waveform 46 illustrates a subcarrier wave in the first, or zero degree, phase state. Waveform **46*a* illustrates the same subcarrier wave in the zero degree phase state during a later modulation period. Waveform 47 illustrates the subcarrier wave in the 90° phase state during the early modulation period and waveform 47*a* illustrates the waveform in the 90° phase state during the subsequent modulation period. Similarly, waveforms 48 and 48*a* illustrate the 180° phase state and waveforms 50 and 50*a* illustrate the 270° phase state. Pulse 56 is the zero-axis-crossing pulse derived from waveform 46 and pulse 56*a* is the zero-axis-crossing pulse derived from waveform 46*a*. Pulse 57, which is displaced to the right represents the zero-axis-crossing pulse which is developed when the subcarrier wave is in the 90° phase state, as indicated by waveform 47. Similarly, pulse 57*a* corresponds to waveform 47*a*. Pulses 58 and 58*a* are the zero-axis-crossing pulses for the 180° phase state, and pulses 60 and 60*a*** are the pulses for the 270° phase state.

If one of the subcarrier waves is in the 0° phase state, zero-axis-crossing pulse 56 will be applied to the delay line 16. The phase-indicating pulse 56 will be delayed to occur at the time of occurrence of the leading edge of the pulse **56*w* at the tap 17 of the delay line 16. Pulse-forming circuit 22 will stretch or lengthen the delayed pulse 56 to produce a gate pulse indicated as pulse 56*w*. Pulse 56 will appear further delayed at tap 18 of the delay line 16 and will be lengthened by pulse-forming circuit 23 to produce pulse 56*x*. Similarly, pulse 56 will be further delayed at taps 20 and 21 and will be lengthened by pulse-forming circuits 24 and 25 to develop gate pulses 56*y* and 56*z*, respectively. Similarly, if the subcarrier wave is in the 90° phase state, as indicated by waveform 47, pulse 57 will be developed and will result in pulses 57*w*, 57*x*, 57*y*, and 57*z*, being produced by the pulse-forming circuits 22, 23, 24, and 25. In a similar fashion, the 180° phase state will result in pulses 58*w*, 58*x*, 58*y*, and 58*z*, and the 270° phase state will result in pulses 60*w*, 60*x*, 60*y*, and 60*z***.

Returning briefly to waveform 40 of FIG. 2, the first modulation period would result in pulse 56 and gate pulses **56*w*, 56*x*, 56*y*, and 56*z*. The second modulation period of waveform 40 would result in pulse 58*a* being developed. Pulse 58*a*** would be applied from the "or"

gate 15 to each of the "and" gates 26, 27, 28, and 30. "And" gate 26 would have applied to it gate pulse 56*w* before the occurrence of pulse 58*a*, and therefore would produce no output pulse. "And" gate 27 would have applied to it gate pulse 56*x* also before the occurrence of pulse 58*a*, and would also have no output pulse. "And" gate 28 would have applied to it gate pulse 56*y* simultaneously with the application of phase-indicating pulse 58*a* and, therefore, pulse 58*a* would pass to the output terminals of "and" gate 28. "And" gate 30 would receive gate pulse 56*z* after the occurrence of phase-indicating pulse 58*a* and would therefore develop no output pulse. Thus, the appearance of pulse 58*a* at the output terminals of "and" gate 28 would be indicative that there was a shift in phase of 180° between the first and second modulation periods of waveform 40 and would therefore be interpreted as a binary sequence 10. Thus, it may be seen that the phase state of the subcarrier wave during the first modulation period determines the relative time position of the gate pulses and the phase state of the subcarrier wave during the second modulation period determines the relative time position of the phase-indicating pulse, and that coincidence between the phase-indicating pulse and the gate pulse is indicative of the relative phase of the successive modulation periods. It should be apparent that because the subcarrier waves are sampled in a sequential manner, the phase modulation from each subcarrier wave is demodulated alternatively. Thus, the information is applied to the utilization circuits 21 in a serial fashion.

If desired, the utilization circuits may by digital techniques, convert the serial information to parallel information trains; however, in many applications, this will not be necessary. Because the subcarrier waves 40 and 41 are not sampled at the beginning of the modulation period, the delayed components of the wave due to multipath propagation will have all been received. Thus, while the multipath components of one subcarrier wave are arriving, the other wave is being sampled, and vice versa. Therefore, the receiver is insensitive to delays due to multipath propagation; however, because of sampling of a plurality of subcarrier waves, information may be transmitted and received at a high rate of speed in spite of the delays. Although the waveforms of FIGS. 2 and 3 do not illustrate phase distortions due to multipath propagation, the receiver is insensitive to such distortions by virtue of the pulse-to-pulse demodulation. At the sampling time, the only phase distortions in the subcarrier wave are due to components of the same modulation period. Therefore, by using pulse-to-pulse comparisons, as is done in the present receiver, no deleterious effects will be observed.

Thus, there has been described a communication receiver which accurately and reliably demodulates a plurality of subcarrier waves in a single, simple phase demodulator by means of a signal-derived phase reference.

What is claimed is:

1. Receiving apparatus for demodulating an applied wave, successive portions of said wave having predetermined discrete phase relationships, said apparatus comprising first means including wave-phase responsive means and gating means, said first means being responsive to said wave for generating individual signal pulses for each of said portions, the time of occurrence of said signal pulses during each of said portions being determined by the phase of said wave within said portions, nonselective delaying means directly connected to said first means and providing a time delay of at least one wave portion for generating a series of delayed and time-staggered gate pulses during a later one of said wave portions in response to each of said signal pulses, each of said signal pulses being coincident with one of said time-staggered gate pulses generated in response to a preceding one of said signal pulses, and gating means coupled to said first means and said delaying means and having a plurality of output terminals, said signal pulses being gated to said output terminals by said last named gating means in response to said gate pulses, coincidence between each of said signal pulses and a particular one of said time-staggered gate pulses determining to which of said output terminals each of said signal pulses will be gated.

2. Receiving apparatus for demodulating a plurality of phase-modulated waves conveying digital information denoted by predetermined phase relationships of successive modulation periods of said waves, said apparatus comprising first pulse-developing means including wave-phase responsive means and gating means, said first means being responsive to said waves for developing phase-indicating pulses whose relative times of occurrence during each of said modulation periods are determined by the relative phase of said carrier waves during successive ones of said modulation periods, second pulse-developing means including nonselective delay means directly connected to said first pulse-developing means and responsive to said phase-indicating pulses for developing individual delayed groups of successively-occurring gate pulses, said groups of gate pulses being delayed in time of occurrence substantially the duration of one of said modulation periods of said waves, and multiple-gating means coupled to said first and second pulse-developing means and responsive to said phase-indicating pulses and to said gate pulses for passing said phase-indicating pulses, coincidence between ones of said phase-indicating pulses and particular ones of said gate pulses in each of said groups being indicative of the particular phase relationships of said successive modulation periods of said waves, thereby being indicative of the particular information conveyed by said waves.

3. In combination, wave-receiving means responsive to a plurality of waves, each being individually and periodically phase modulated, frequency-conversion means coupled to said wave-receiving means for converting the frequency of each of said plurality of waves to a predetermined frequency, a plurality of wave phase responsive pulse-forming circuits coupled to said frequency-conversion means for developing individual pulses corresponding to each cycle of each of said waves, the relative time of occurrence of each pulse being dependent on the relative phase of the corresponding cycle, sampling means having a sampling rate equal to the modulation period of said waves and coupled to said pulse-forming circuits for sequentially gating selected ones of said pulses into a serial pulse train, a nonselective delay line directly connected to said sampling means and having a plurality of taps, a plurality of gate pulse-forming circuits individually coupled to said taps of said delay line, and a plurality of coincidence gates individually coupled to said gate pulse-forming circuits, each of said coincidence gates being coupled to said sampling means.

4. In combination, wave-receiving means responsive to a plurality of waves, each being individually and periodically phase modulated, a frequency converter for each of said waves connected to said wave-receiving means for individually converting the frequency of said plurality of waves to a predetermined frequency, a bandpass filter for each of said waves individually connected to said converters for passing waves solely of said predetermined frequency, a wave-phase responsive pulse-forming circuit for each of said waves individually connected to said filters for forming individual pulses for each cycle of each of said waves, the relative time of occurrence of each pulse being dependent on the relative phase of the corresponding cycle, a plurality of sampling AND gates individually connected to said pulse-forming circuits, a sampling pulse generator connected to each of said sampling AND gates and synchronized to the modulation period of each of said waves, an OR gate connected to each of said sampling AND gates, a delay line connected to said OR gate and having a plurality of taps, a plurality of gate pulse-forming circuits individually connected to said taps of said delay line, a plurality of coincidence gates individually connected to said gate pulse-forming circuits, each of said coincidence gates being connected to said OR gate, and digital utilization circuits connected to said coincidence gates.

5. In combination, wave-receiving means responsive to first and second waves, each having combinations of four-phase relationships and being individually and periodically phase modulated, a first frequency converter connected to said wave-receiving means for converting the frequency of said first wave to a predetermined frequency, a first bandpass filter connected to said first converter for passing waves solely of said predetermined frequency, a first pulse-forming circuit connected to said first filter for forming individual pulses for each cycle of said first wave, the relative time of occurrence of each pulse being dependent on the relative phase of the corresponding cycle of said first wave, a first sampling AND gate connected to said first pulse-forming circuit, a second frequency converter connected to said wave-receiving means for changing the frequency of said second wave to said predetermined frequency, a second bandpass filter connected to said second converter for passing only waves of said predetermined frequency, a second pulse-forming circuit connected to said second filter, a second sampling AND gate connected to said second pulse-forming circuit, a sampling pulse generator connected to said first and second sampling AND gates and synchronized to the modulation period of said first and second waves, an OR gate connected to said first and second sampling AND gates, a delay line connected to said OR gate and having first, second, third, and fourth taps, first, second, third, and fourth gate pulse-forming means individually connected to said first, second, third, and fourth taps of said delay line, first, second, third, and fourth coincidence gates individually connected to said first, second, third, and fourth gate pulse-forming means, each of said coincidence gates being connected to said OR gate, and digital utilization circuits connected to each of said coincidence gates.

References Cited in the file of this patent

UNITED STATES PATENTS

| | | |
|---|---|---|
| 1,854,247 | Brand et al. | Apr. 19, 1932 |
| 2,408,079 | Labin et al. | Sept. 24, 1946 |
| 2,462,100 | Hollabaugh | Feb. 22, 1949 |
| 2,468,038 | Clavier | Apr. 26, 1949 |
| 2,549,422 | Carbrey | Apr. 17, 1951 |
| 2,784,257 | Earp | Mar. 5, 1957 |
| 2,861,257 | Weintraub | Nov. 18, 1958 |